Sept. 24, 1929.   H. H. MOTHERAL   1,729,178
PRESSURE GAUGE
Filed May 8, 1928   2 Sheets-Sheet 1
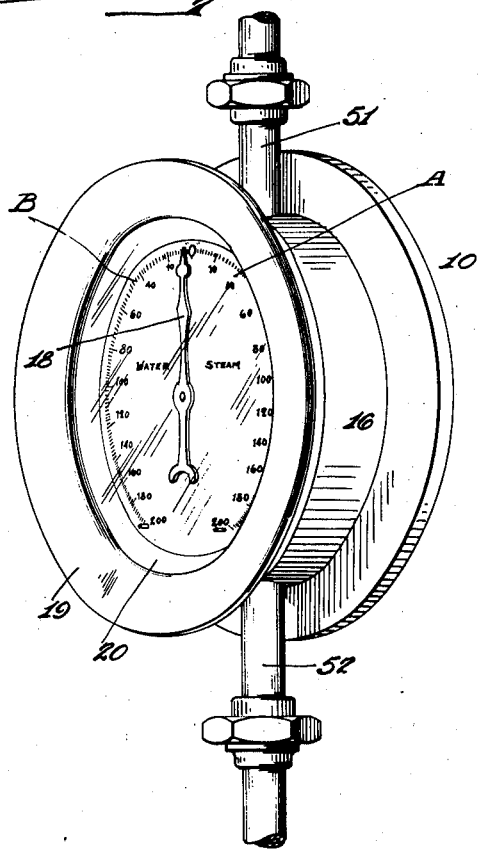
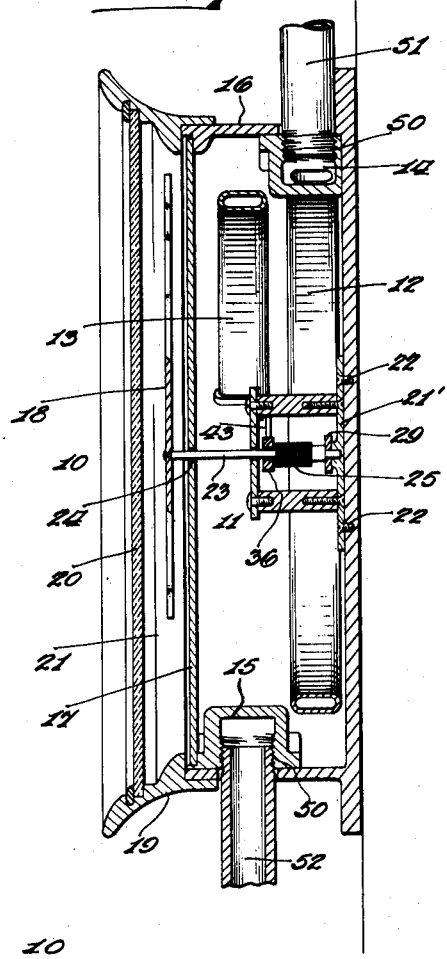
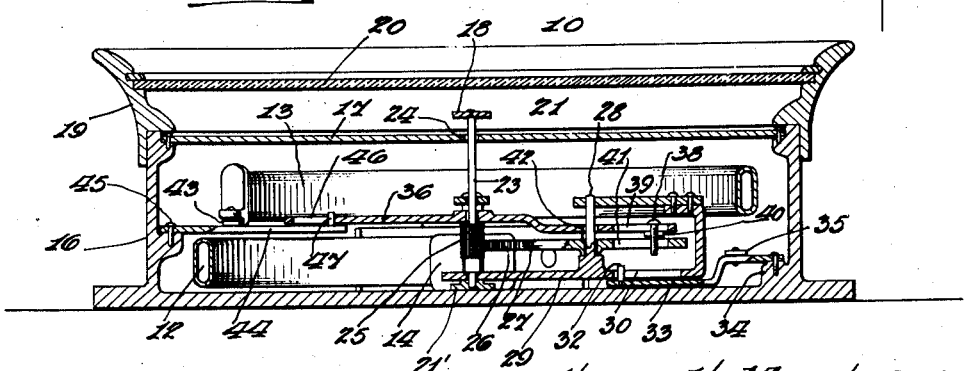
HARRY H. MOTHERAL
INVENTOR
BY *Victor J. Evans*
ATTORNEY
WITNESS:

Sept. 24, 1929. H. H. MOTHERAL 1,729,178
PRESSURE GAUGE
Filed May 8, 1928 2 Sheets-Sheet 2

HARRY H. MOTHERAL
INVENTOR
BY Victor J. Evans
ATTORNEY

WITNESS:

Patented Sept. 24, 1929

1,729,178

UNITED STATES PATENT OFFICE

HARRY H. MOTHERAL, OF YONKERS, NEW YORK

PRESSURE GAUGE

Application filed May 8, 1928. Serial No. 276,185.

This invention relates to improvements in pressure gauges and has particular reference to a differential pressure gauge for steam turbines or the like.

The primary object of the invention resides in a pressure gauge which indicates on one dial by one indicating hand the difference in the pressure of two separate pressures, such as steam and water.

Another object of the invention is to provide a pressure gauge that will indicate the pressure of one element independent of the other when desired.

Another object is to provide a pressure gauge with equalizing means which holds the indicating hand at the zero mark when the hollow gauge springs move in unison.

A further object of the invention resides in a differential pressure gauge which is easy to read, simple in construction, inexpensive of manufacture, and which is positive in its operation for the purposes intended.

With the above and other objects in view, the invention consists in certain novel features, construction and combination of parts hereinafter described and particularly pointed out in the appended claims, the advantages of which will be readily understood and appreciated by those skilled in the art to which the invention pertains.

The invention will be clearly understood from the accompanying drawings illustrating the invention in its preferred form, and the following detailed description of the construction therein shown.

In the drawings:—

Figure 1 is a perspective view of my differential pressure gauge.

Figure 3 is a vertical transverse sectional view taken on the line 3—3 of Figure 2.

Figure 4 is a horizontal sectional view taken on the line 4—4 of Figure 2.

Figure 2:
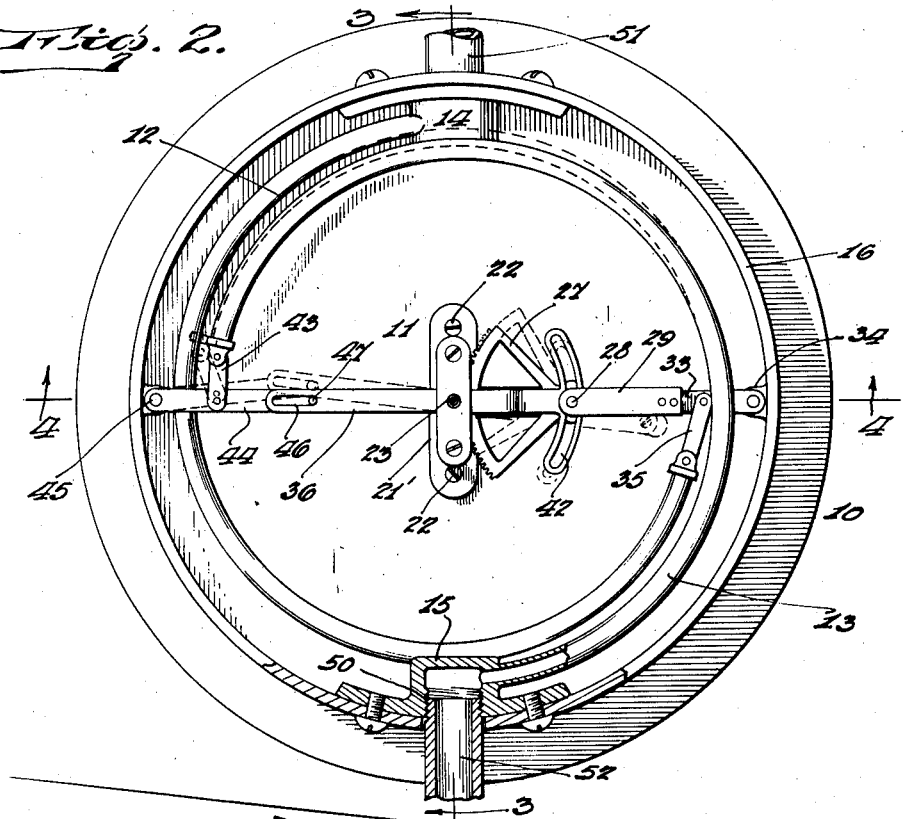
Figure 2 is a front view of the same with the dial removed.
Figure 5:
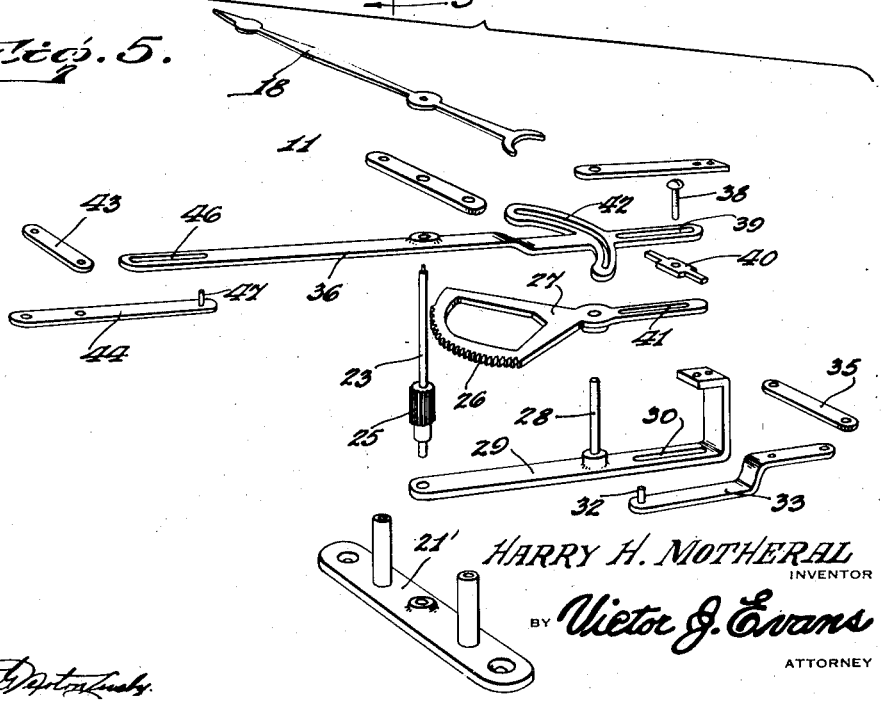
Figure 5 is a perspective view of the operating parts per se in a separated condition.

Referring to the drawings by reference characters, the numeral 10 designates my improved differential pressure gauge in its entirety which includes an equalizing device 11 pivotally attached to the free ends of a pair of flat tubular curved flexible members 12 and 13, extending from headers 14 and 15 mounted on the inner side wall of a casing 16. A dial 17 closes the front of the casing, while the sets of indicia "A" and "B" on the same, and an indicating hand 18 are protected by the usual rim 19 and glass 20 which provide a space 21 between the dial 17 and the glass 20 to allow the indicating hand to oscillate.

The equalizing device 11 comprises a bearing support 21' mounted centrally upon the back wall of the casing 16 by screws or the like 22, and rotating within the bearing support is an arbor 23 which extends through an opening 24 in the center of the dial 17 and carries the indicating hand 18. Integral with the arbor 23 is a gear 25 which meshes with teeth 26 of a segment 27 swingably mounted on a shaft 28 within a frame 29 which in turn swings upon the arbor 23. The frame 29 is provided with a slot 30 to receive a pin 32 on the free end of a lever 33 which is pivoted upon a boss 34 on a wall of the casing 16 and is operable by the flexible tube 12 connected thereto by a link 35.

For swinging the segment 27 in the opposite direction, I provide an arm 36 which also pivots on the arbor 23 having a threaded pin 38 extending through a slot 39 provided in one of the ends of the arm 36 and locked in an adjusted position by a lock nut 40, the free end of the pin sliding within a slot 41 provided in the tail of the segment 27. To allow the arm 36 to extend beyond the pivot point of the segment 27, I provide therein an arcuate shaped slot 42 which allows the arm to swing the segment to a further position. The opposite end of the arm 36 is swung by the flexible tube 13 by a link 43 pivoted to a lever 44 which has one end pivoted to the side wall of the casing as at 45 while the opposite end is slidably connected to the arm 36 by slot and pin 46 and 47 respectively.

The headers 14 and 15 which are mounted diametrically opposite each other on the inner side wall of the casing have threaded bores 50 to receive the threaded end of pipes 51 and 52 which convey the medium such as steam and water respectively, of which the pressures and pressure differences are to be measured.

Should it be desired to know the exact pressure pound of water, a valve, not shown, on the steam line is closed and a valve on the water line opened, allowing the water to flow through the pipe 52 into the header 15 to the flexible tube 13 which, when under pressure will tend to swing to a straightened position, therefore the free end of the same pulls on the links 43 swinging the lever 44, lifting the arm 36 which is pivoted on the arbor 23 swinging the free end of the arm in a downward position carrying the tail of the segment 27 down causing the spindle to turn in a counter clockwise direction as the teeth 26 on the segment 27 are in mesh with the gear 25 on the arbor. This position of the parts is shown in Figure 2 of the drawings in dotted lines. The indicating hand 18, which is attached to the free end of the arbor, will point to the number of pounds pressure on the left hand side of the zero mark co-acting with the scale of graduations B.

To read the exact pressure of the steam independent of that of the water, the valve in the water line is closed, releasing the pressure on the gauge spring 12 and allowing the same to return to normal position as shown in full lines in Figure 2. A valve on the steam line is then opened and as the steam travels through the header 14 into the gauge spring 12 the pressure will force the free end of the spring toward the wall of the casing, the link 35 which is pivoted at one end to the free end of the gauge spring 12 and the opposite end to the lever 33 will tend to swing the free end of the lever in a downward direction which in turn swings the outer end of the carriage 29 in a downward direction also. It will be readily seen that the tail of the segment 27 will be held by the pin 38 on the arm 36 while the shaft 28, on which the segment pivots, moves on an arc of the centre arbor. During this operation, the arbor 23 will be turned in the opposite direction to that shown in dotted lines in Figure 2 swinging the indicating hand in a clock-wise direction to indicate and measure the number of pounds pressure of steam.

To determine the difference in pressure of both steam and water, the valve in the water line is again opened allowing the water to flow into the flexible tube 13 operating the parts as described above, turning the indicator in a counter clock-wise direction and should the pressure of the water be the same as that of the steam the indicator will stop on the zero mark. Should the pressure of the water be, say ten pounds less than that of the steam pressure, the indicating hand will stop at ten on the right hand side of the zero mark.

Although I have explained the operation of the gauge by water and steam, the same will operate by any two mediums under pressure.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a differential pressure gauge, a casing, pressure pipes entering said casing, Bourdon tubes connected to the respective pipes, an arbor having a pinion and an indicator member fixed thereon, means for rotatably supporting the arbor in the casing, a rocker arm pivoted on said arbor, a frame pivoted on said arbor, a stud carried by said frame and extending through an opening in said rocker arm, a gear segment swingingly mounted on said stud and meshing with said pinion, one end of said rocker arm being connected to the closed end of one of said tubes by a plurality of pivoted links, the other end having sliding pivotal connection with the segment, whereby outward flexing of one of said Bourdon tubes will actuate the said rocker arm to impart movement to said gear segment in one direction by reason of a pin and slot arrangement therebetween, and a plurality of operatively connected links between the closed end of the other of said Bourdon tubes and said frame to swing said frame to impart a reverse movement to said gear segment.

2. A differential pressure gauge consisting of a pair of Bourdon tubes, a fluid charging connection for each tube, a bearing support, an indicator carrying shaft pivoted to turn on said support, a pinion gear on said shaft, a frame pivoted to swing on said shaft, a gear segment pivoted to swing on the pivoted frame and engaging the pinion, means having pivotal connection with one end of one of the Bourdon tubes and pivotal connection with the gear segment, and a member having pivotal connection with the other Bourdon tube and pivotal connection with the pivoted frame, whereby the movement of one Bourdon tube exerted to turn said indicator carrying shaft in one direction will be modified by the movement of the other Bourdon tube exerted to turn the shaft in the opposite direction, while allowing both tubes unrestrained freedom of movement, In testimony whereof I have affixed my signature.

HARRY H. MOTHERAL.